> 3,822,295
> 2,3-DIHYDRO - 2,2-DIMETHYL-7-BENZOFURANYL SODIUM AND A METHOD FOR ITS PREPARATION, AND ITS USE IN THE PREPARATION OF CARBOFURAN
> Alexander Serban, Doncaster, Victoria, and Phillip Knox Engel, Tullamarine, Victoria, Australia, assignors to ICI Australia Limited, Melbourne, Victoria, Australia
> No Drawing. Filed Nov. 16, 1972, Ser. No. 307,204
> Claims priority, application Australia, Dec. 2, 1971, 7,255/71
> Int. Cl. C07d 5/14
> U.S. Cl. 260—346.2 R     9 Claims

ABSTRACT OF THE DISCLOSURE

A new compound, 2,3-dihydro-2,2-dimethyl-7-benzofuranyl sodium and methods of making it are described. The new compound is useful for preparing chemicals, particularly carbofuran.

---

This invention relates to a new compound and to processes in which it may be used. More particularly the invention relates to a derivative of benzofuran useful in chemical manufacturing processes.

Accordingly we provide as a new compound the substance 2,3-dihydro - 2,2 - dimethyl-7-benzofuranyl sodium having the structural formula:

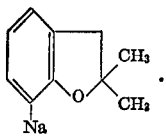

The compound of our invention may conveniently be prepared by reacting 2,3-dihydro-2,2-dimethylbenzofuran with an organo-sodium compound, for example an alkyl sodium compound such as ethyl sodium, butyl sodium, amyl sodium or hexyl sodium, or a cycloalkyl sodium compound such as cyclohexyl sodium.

The choice of the organo sodium compound is not narrowly critical and is dictated merely by availability and ease of handling in respect of stability. Thus for example in respect of alkyl sodium compounds we prefer to use those in which the alkyl chain is not branched, for example n-amyl sodium, rather than compounds in which the alkyl chain is branched, for example isoamyl sodium, since it is believed that the former type is the more stable. The reaction referred to above should be performed in an inert atmosphere, for example in an atmosphere of nitrogen or argon; it is desirable that the presence of water, oxygen and carbon dioxide be controlled to the lowest possible level so as to avoid extensive undesired side reactions. The temperature of the reaction is not narrowly critical and will depend amongst other things on the nature of the organo-sodium compound used. Suitably the temperature range may be from −30° C. to +150° C., but in many instances we have found that a temperature in the range from −10° C. to +50° C. is convenient. Whilst the reaction may be performed in the absence of a solvent, it is usually more convenient to perform the reaction in the presence of an inert solvent or a mixture of inert solvents. From amongst suitable solvents there may be mentioned hydrocarbons and ethers, for example aliphatic hydrocarbons such as hexane and decane and cyclic ethers such as tetrahydrofuran. The organo-sodium compounds referred to above may be used in the form of a suspension, for example the compounds may suitably be dispersed in a hydrocarbon solvent such as hexane or ligroin. Alternatively the organo-sodium compounds may be prepared in situ in the reaction vessel from sodium and an appropriate organic compound, suitably a halide and preferably a chloride. The reactants may be present in stoichiometric proportions but it is preferred that there be present in the reaction mixture an excess of the organo-sodium compound. The time of reaction will vary with the reaction conditions for example the temperature of reaction, the degree of stirring or the concentration of the reactants. We have found for example that satisfactory yields may be obtained when the reaction is performed at a temperature in the range from 25° C. to 40° C. for several hours.

Accordingly we provide a process for the manufacture of 2,3-dihydro-2,2-dimethyl-7-benzofuranyl sodium which process comprises reacting 2,3-dihydro-2,2-dimethyl benzofuran with an organo-sodium compound in an inert atmospher. Preferably the reaction is performed at a temperature in the range from −10° C. to 50° C.

The compound of our invention is useful as a material from which chemicals may be made. Whilst it may be separated and recovered from the reaction medium in which it is prepared such a procedure is somewhat difficult since the compound is prone to instability in air. We have found it more convenient therefore when using our compound as a raw material or an intermediate material in a chemical manufacturing process to use it without separation from the reaction mixture in which it was made. Our compound is useful in the preparation for example of carboxylic acids or hydroxy compounds and in particular it is very useful in the manufacture of carbofuran.

Carbofuran, 2,3 - dihydro-2,2-dimethyl-7-benzofuranyl N-methylcarbamate, is known to be useful as an insecticide, but hitherto it has suffered from the commercial disadvantage of being relatively expensive when compared with other commercially available comparable insecticides. It is known that carbofuran may be made using catechol as a starting material; catechol however is comparatively expensive and furthermore because it contains two hydroxy groups there is a pronounced tendency for large quantities of undesired by-products to be formed and the overall yield of the desired product is relatively low. Processes are also known whereby carbofuran may be made using o-chlorophenol or o-nitrophenol, but these processes suffer from the disadvantage that many process steps are involved and that as a consequence the overall yield of desired product is low.

We have now discovered that carbofuran may be prepared more conveniently and in higher yield than has hitherto been possible if 2,3-dihydro-2,2-dimethyl-7-benzofuranyl sodium is used as the starting raw material.

Accordingly we provide a process for the preparation of 2,3-dihydro-2,2-dimethyl-7-benzofuranyl N-methylcarbamate which process comprises the steps of:

(1) reacting 2,3-dihydro-2,2-dimethyl-7-benzofuranyl sodium with oxygen or an oxygen containing gas, acidifying the reaction product so formed to produce 2,3 - dihydro-2,2-dimethyl-7-hydroxybenzofuran of the structural formula:

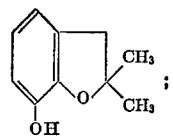

and (2) reacting said 2,3-dihydro-2,2-dimethyl-7-hydroxybenzofuran with methyl isocyanate to form 2,3-dihydro-2,2-dimethyl-7-benzofuranyl N-methylcarbamate having the structural formula:

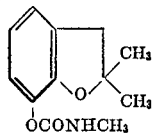

and recovering said carbamate.

It has long been considered that it is impossible to oxidize the alkali metal (excluding lithium) derivatives of aromatic hydrocarbons and that this view is still maintained is apparent from the most recent edition of the well-known reference work Methoden der Organische Chemie (Houben-Weyl), Vol. XIII/I, published by Georg Thieme Verlag, Stuttgart, 1970, wherein it is stated at page 556 that the alkali metal drivatives (excluding lithium) of aromatic hydrocarbons cannot be oxidized at all and only the metal peroxides are obtained with the regeneration of the original hydrocarbon. It is therefore surprising to find that step (1) of our process for the manufacture of carbofuran can be performed.

In step (1) of the above process the reaction mixture is preferably stirred whilst the oxygen or an oxygen containing gas such as air is passed through the mixture. It is desirable that moisture and carbon dioxide be excluded from the reaction vessel and therefore it is desirable that the oxygen or oxygen containing gas be dried and carbon dioxide removed prior to use. It has been found that some of the solvent is entrained in the gas stream and if desired the entrained solvent may be removed from the reaction mixture by this means and subsequently recovered for further use. The acidification of the reaction mass is conveniently performed in an aqueous medium. Such a medium serves as a means of decomposing any residual amount of the organo-sodium compound which may be present and also provides a medium for solution of the sodium phenate. The nature of the acid used is not narrowly critical and may be for example, hydrochloric acid, sulphuric acid, carbonic acid, acetic acid or chloracetic acid. Although the acidification may be performed at elevated temperatures we have found it convenient to perform it at a temperature in the range from 0 to 40° C., suitably at room temperature, under which conditions the reaction is substantially completed within a short time.

The step (2) of the above process is well known and involves performing the reaction at ambient temperature in an inert solvent, for example diethylether, in the presence of catalyst, for example a tertiary amine such as triethylamine. The desired product may then be separated from the reaction mixture and purified by known means for example by crystallization.

In the process for the manufacture of carbofuran described above the 2,3-dihydro-2,2-dimethyl-7-hydroxybenzofuran may be separated if desired from the reaction mixture of step (1) prior to converting it to carbofuran, or the process may be performed without such a separation step. It will be appreciated that the yield and cost of products made from the compound of our invention will depend to some extent on the scale of the process used, the degree to which unreacted materials obtained at various stages of such a process are recovered and reused, the recovery and reuse of ancillary materials such as solvents, gases and the like used in such a process and the costs of handling and recovering the substances made during such a process.

The process whereby carbofuran may be made from the compound of our invention is particularly useful in that it provides a means whereby 2,3-dihydro-2,2-dimethyl-7-benzofuranyl N-methylcarbamate may be prepared more cheaply, more conveniently and in higher yield than has hitherto been possible. This has the attendant advantage that because of the lower cost of the carbofuran manufactured by such a process the use thereof will become more economic in the eradication and control of undesired insects and hence offers a replacement for the cheap chlorinated hydrocarbon insecticides the use of which has now been greatly curtailed in many countries.

Our invention is now illustrated by, but by no means limited to, the following examples wherein all parts and percentages are on a weight basis unless otherwise specified.

EXAMPLE 1

Dry nitrogen which had been purified to remove impurities in the form of oxygen and carbon dioxide was fed into a reaction vessel fitted with a stirrer to provide an inert atmosphere within the reaction vessel. 50 ml. of dry hexane was added to the vessel and stirred. There was then added to the vessel 2.7 g. of a dispersion consisting of equal parts of sodium and paraffin wax and whilst being maintained in a stirred condition the mixture was refluxed for 5 minutes in the inert atmosphere. The mixture was then cooled to room temperature and there was then added thereto with stirring 3.7 g. of 2,3-dihydro-2,2-dimethylbenzofuran. The resultant mixture was refluxed for 5 minutes and then cooled to 35° C. To the so treated mixture there was added in a dropwise manner a solution of 2.6 g. of amyl chloride dissolved in 10 ml. of dry hexane. During this addition the reaction mixture changed colour from a shade of grey to a shade of khaki and there formed a solid product (I). The contents of the reaction vessel were stirred for a further two hours at a temperature in the range from 35 to 38° C. after which time the formation of product (I) was virtually complete. The reaction mixture was transferred by means of nitrogen pressure from the reaction vessel to a slurry of solid carbon dioxide and hexane. The resultant mixture was warmed to room temperature and water was added cautiously thereto. There was thus obtained a two phase system consisting of an aqueous phase and an organic phase. This latter phase was separated from the aqueous phase and extracted with 8% aqueous sodium hydroxide solution. The extract so obtained was combined with the aqueous phase and this combined material was acidified to pH 1 and extracted further with diethylether. The ether extract was dried and concentrated whereupon 3 g. of a solid product was obtained by crystallization, filtration and drying. The product was recrystallized from diethylether to give a product (II) which was a 2,3-dihydro-2,2-dimethylbenzofuranylcarboxylic acid of melting point 138 to 139° C. Analysis of product (II) by nuclear magnetic resonance and infrared spectroscopy confirmed the presence of a carboxylic group but these techniques were unable to determine with certainty as to whether product (II) was the 4-isomer or the 7-isomer. So that this matter could be resolved an amount of 7-bromo-2,3-dihydro-2,2-dimethylbenzofuran was converted to its Grignard derivative and this latter was then carbonated to 2,3-dihydro-2,2-dimethylbenzofuranyl-7-carboxylic acid (III) having the structural formula:

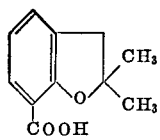

By determining the mixed melting point of compounds (II) and (III) and comparing the individual melting points and infrared spectra of the two compounds it was demonstrated that compounds (II) and (III) were identical. It was thus demonstrated that compound (I) of our invention, from which compound (II) had been derived, was of the structural formula:

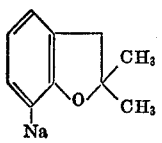

This example demonstrates a means whereby 2,3-dihydro-2,2-dimethyl-7-benzofuranyl sodium may be prepared.

EXAMPLE 2

The general procedure of Example 1 was repeated but the n-amyl chloride of that Example was replaced by 2.3 grams of cyclohexylchloride. There was thus obtained 2,3-dihydro-2,2-dimethyl-7-benzofuranyl sodium.

EXAMPLE 3

The general procedure of Example 1 was repeated but the n-amyl chloride of that Example was replaced by 2.9 grams of cyclohexylcholride. There was thus obtained 2,3-dihydro-2,2-dimethyl-7-benzofuranyl sodium.

EXAMPLE 4

A dispersion of 12 g. sodium in 12 g. paraffin wax was placed in a reaction vessel and to this was added 18.5 g. 2,3 - dihydro-2,2-dimethylbenzofuran and 250 ml. dry hexane. The mixture was refluxed for five minutes under an atmosphere of dry nitrogen which had been purified to remove impurities in the form of oxygen and carbon dioxide. The contents of the reaction vessel were then cooled to 35° C. and a solution of 27 g. n-amyl chloride in 50 ml. dry hexane was added dropwise to the stirred reaction mixture over a period of one hour during which time the colour of the reaction mixture changed from a light grey shade to an olive green shade. The contents of the reaction vessel were then stirred for a further two hours at a temperature in the range from 35° C. to 38° C. The contents of the reaction vessel were cooled to 0° C. and dry air, free of carbon dioxide, was bubbled through the contents of the reaction vessel for 30 minutes at this temperature at a rate of 40 ml./minute. The temperature of the contents of the reaction vessel was then raised to 20° C. and the passage of dry purified air was continued at the same rate for 16 hours. The contents of the reaction vessel were then stirred and water was added thereto. The water was added cautiously and dropwise to the stirred contents during the initial stages of the addition and the rate of water addition was then increased until 200 ml. water had been added. The mixture so obtained was transferred to a separating funnel and the aqueous phase separated from the non-aqueous phase. The non-aqueous phase was extracted with 100 ml. of an aqueous 8% w./v. sodium hydroxide solution and the alkaline aqueous extract so obtained was then combined with the aqueous phase referred to above. The combined aqueous phase was then extracted with hexane, the hexane extract was added to the extracted non-aqueous phase referred to above, the extracted combined aqueous phase was acidified with concentrated hydrochloric acid to pH 1 and then extracted with ether. The acidic ether extracted aqueous phase was discarded. The ether extract was extracted with a saturated aqueous sodium bicarbonate solution, then washed with water, dried and filtered. The ether was then evaporated to give 10 g. of a light brown oil which on fractional vacuum distillation yielded 7.3 g. of a colourless oil boiling at 81 to 82° C. at 1.1 mm. Hg pressure. They product so obtained was identified by means of thin layer chromatography, infrared spectroscopy and nuclear magnetic resonance as being 2,3-dihydro-2,2-dimethyl-7-hydroxybenzofuran useful as an intermediate in the preparation of carbofuran. 8 g. of unreacted 2,3-dihydro-2,2-dimethylbenzofuran was recovered from the combined non-aqueous phase and hexane extract referred to above.

EXAMPLE 5

To a cold solution of 8.2 g. 2,3-dihydro-2,2-dimethyl-7-hydroxybenzofuran prepared by the method of Example 4 in 10 ml. of diethylether there was added 0.05 g. triethylamine and 2.9 g. methyl isocyanate. The mixture was stirred at room temperature for 15 minutes and a white crystalline product precipitated. Separation of the solid yielded 8.8 g. of a product having a melting point of 151–2° C. and identified by elemental analysis, infrared spectroscopy and nuclear magnetic resonance as 2,3-dihydro-2,2-dimethyl-7-benzofuranyl N-methylcarbamate.

What is claimed is:

1. 2,3-dihydro-2,2-dimethyl-7-benzofuranyl sodium.
2. A process for the manufacture of 2,3-dihydro-2,2-dimethyl-7-benzofuranyl sodium which process comprises reacting 2,3-dihydro-2,2-dimethylbenzofuran with an organo-sodium compound in an inert atmosphere.
3. A process according to Claim 2 wherein said organo-sodium compound is selected from the group consisting of alkyl sodium compounds and cyclo-alkyl sodium compounds.
4. A process according to Claim 3 wherein said alkyl sodium compound is selected from the group consisting of ethyl sodium, butyl sodium, amyl sodium and hexyl sodium.
5. A process according to Claim 3 wherein the alkyl chain of said alkyl sodium compound is not branched.
6. A process according to Claim 2 wherein said process is performed at a temperature in the range from −10° C. to +50° C.
7. A process according to Claim 2 wherein said organo-sodium compound is prepared in situ.
8. A process according to Claim 7 wherein said organo-sodium compound is prepared from sodium and an alkyl or cycloalkyl halide.
9. A process for the preparation of 2,3-dihydro-2,2-dimethyl-7-benzofuranyl N-methylcarbamate which process comprises the steps of:
   (1) reacting 2,3 - dihydro-2,2-dimethyl-7-benzofuranyl sodium with oxygen or an oxygen containing gas, acidifying the reaction product so formed to produce 2,3-dihydro-2,2-dimethyl-7-hydroxybenzofuran; and
   (2) reacting said 2,3 - dihydro-2,2-dimethyl-7-hydroxybenzofuran with methyl isocyanate to form 2,3-dihydro-2,2-dimethyl-7-benzofuranyl N-methylcarbamate and recovering said carbamate.

References Cited

C.A., vol. 64, 1966, pp. 3484e–3485e.

HENRY R. JILES, Primary Examiner

M. A. M. CROWDER, Assistant Examiner